United States Patent
Malik et al.

(10) Patent No.: US 7,646,911 B2
(45) Date of Patent: Jan. 12, 2010

(54) CONVERSION METHOD, APPARATUS AND COMPUTER PROGRAM FOR CONVERTING A DIGITAL IMAGE OBTAINED BY A SCANNER

(75) Inventors: Julien Malik, Paris (FR); Frederic L. M. J. Michon, Toulouse (FR)

(73) Assignee: Oce-Technologies B.V., Venlo (NL)

( * ) Notice: Subject to any disclaimer, the term of this patent is extended or adjusted under 35 U.S.C. 154(b) by 681 days.

(21) Appl. No.: 11/503,019

(22) Filed: Aug. 14, 2006

(65) Prior Publication Data

US 2007/0041027 A1 Feb. 22, 2007

(30) Foreign Application Priority Data

Aug. 16, 2005 (EP) .................. 05291732

(51) Int. Cl.
  *G06K 9/00* (2006.01)
  *G06K 9/32* (2006.01)
  *H04N 1/60* (2006.01)

(52) U.S. Cl. .............. 382/169; 382/190; 382/300; 358/1.9; 358/3.06

(58) Field of Classification Search .......... 382/162, 382/164, 167, 169, 171–173, 190, 228, 272, 382/275, 300; 358/1.13, 1.9, 3.06, 463, 464, 358/518, 522, 530
See application file for complete search history.

(56) References Cited

U.S. PATENT DOCUMENTS

| | | | |
|---|---|---|---|
| 6,323,957 B1 | 11/2001 | Ball | |
| 6,924,909 B2 * | 8/2005 | Lee et al. | 358/1.9 |
| 7,492,477 B2 * | 2/2009 | Shigeta | 358/1.9 |
| 7,522,312 B2 * | 4/2009 | Inoue et al. | 358/3.13 |
| 7,525,702 B2 * | 4/2009 | Guleryuz | 358/518 |
| 7,535,595 B2 * | 5/2009 | Miyagi et al. | 358/1.9 |
| 2007/0041027 A1 * | 2/2007 | Malik et al. | 358/1.9 |

FOREIGN PATENT DOCUMENTS

| | | |
|---|---|---|
| EP | 0 188 193 A2 | 7/1986 |
| EP | 0 963 106 A2 | 12/1999 |
| EP | 1 079 599 A2 | 2/2001 |
| EP | 1 174 824 A2 | 1/2002 |
| EP | 1 209 621 A2 | 5/2002 |

* cited by examiner

*Primary Examiner*—Amir Alavi
(74) *Attorney, Agent, or Firm*—Birch, Stewart, Kolasch & Birch, LLP

(57) ABSTRACT

An image conversion method and an apparatus for converting a digital image obtained by a scanning unit into a converted digital image includes the steps of acquiring statistics for at least some pixels of the digital image, extracting characteristic values of a background color using the acquired statistics, operating a selection of pixels in the digital image, and converting the selected pixels. Each pixel in the digital image is sequentially set as a target pixel, and the selection of the target pixel depends on a representative color distance determined between a number of pixels located in a vicinity of the target pixel and the background color.

20 Claims, 3 Drawing Sheets

CONVERSION METHOD, APPARATUS AND COMPUTER PROGRAM FOR CONVERTING A DIGITAL IMAGE OBTAINED BY A SCANNER

CROSS-REFERENCE TO RELATED APPLICATIONS

This nonprovisional application claims priority under 35 U.S.C. § 119(a) on Patent Application No. 05291732.5, filed in Europe on Aug. 16, 2005, the entirety of which is incorporated herein by reference.

BACKGROUND OF THE INVENTION

1. Field of the Invention

The present invention relates to an image conversion method for converting a digital image obtained by a scanning unit into a converted digital image. The image conversion method includes the steps of acquiring statistics for at least some pixels of the digital image, extracting characteristic values of a background color using the acquired statistics, operating a selection of pixels in the digital image, each pixel in the digital image being sequentially set as a target pixel, and converting the selected pixels.

2. Description of Background Art

Documents to be scanned often have large portions of non-marked areas representing the background of the image. However, when the scanner is not well-calibrated or when the non-marked areas in the documents are far from white, as may be the case with old yellowish papers or blue prints, the digital image obtained by scanning such documents presents background areas which are not white. Therefore, in the raster image file obtained by scanning such a document, the background areas are represented by non-white pixels. Background correction algorithms are applied to the digital image obtained by a scanning unit in order to detect background areas and correct the pixels in such areas, most of the time to white pixels. When a raster image is to be printed, a white pixel in the raster image file is translated into a dot 'not to be printed'. The benefits of background correction algorithms are, among other things, ink or toner saving when the converted image is printed. In addition, a more easily compressible and more rapidly viewable image when it is stored and/or viewed on a computer can be obtained.

An image conversion method of the above type is known from U.S. Pat. No. 6,323,957. It is attempted to eliminate undesirable background dots which give rise to noise within a document obtained by scanning of an original. With the known method, an original document is scanned by a scanner and transformed into a stream of pixels. Statistics for at least some pixels of a pixel stream generated by the scanner are acquired in order to determine a background color of the document. Incoming pixels of the scanned document are compared with the value of the determined background color. Pixels found to be 'near' background color values are selected and are converted. Pixels found 'far' from the background color values are not selected (meaning that they are left unchanged). The pixels found between 'near' and 'far' are selected and are converted in a linear manner. For each incoming pixel, the color distance between said incoming pixel and a reference pixel corresponding to the background color is calculated and the result of the calculation is used as a criterion to select or not select said incoming pixel. If the incoming pixel is selected, it is converted. A significant disadvantage is that the converted images obtained by the known method often present a speckling effect. Specifically, in substantially uniform colored areas, the presence of many white points may occur. In background areas, the presence of many colored points may occur as well.

SUMMARY OF THE INVENTION

The object of the present invention is to improve an image conversion method of the above type such that the speckling effect is reduced and the quality of the converted images is improved.

The present invention achieves this object for an image conversion method of the above type in which the selection of the target pixel depends on a representative color distance determined between a number of pixels located in a vicinity of the target pixel and the background color.

Most of the time, noise is present in digital images obtained by a scanning unit. Noisy pixels may be defined as pixels having colorimetric values significantly differing from the calorimetric values of the pixels located in the neighborhood thereof.

With the method of the present invention, a wrong selection for conversion of some noisy pixels present in substantially uniform colored areas is avoided. In such an area, the representative color distance determined between a number of pixels located in a vicinity of the target pixel in the digital image and the background color is generally more than a predefined threshold value. In such case, a noisy pixel is not selected for conversion, even if its color is close to the background color. The results obtained are better than when the selection is based only on the color of the isolated target pixel. Experiments have indeed shown that it is better to leave a noisy pixel in a substantially uniform colored area to its original colorimetric values than to convert it to white (or to an intermediate value).

The absence of selection for conversion of some noisy pixels found in background areas is avoided as well. In such an area, the representative color distance determined between a number of pixels located in a vicinity of the target pixel in the digital image and the background color is generally less than a predefined threshold value. In such case, a noisy pixel is selected for conversion, even if its original color is far from the background color. Once selected, the noisy pixel is converted, for example to pure white, or to an intermediate value. After the conversion, the noisy pixel is not visible anymore.

Thanks to the fact that noisy pixels in uniform colored areas are not selected for conversion, while noisy pixels in background areas are selected for conversion, the speckling effect in converted digital images is strongly reduced, and the quality of the digital images is greatly enhanced.

In one embodiment of the method according to the present invention, the representative color distance is the averaged squared distance between a number of pixels located in the vicinity of the target pixel and the background color. That way, the representative color distance can be determined easily and leads to good results. Preferably, the representative color distance is determined in a perceptual color space.

In another embodiment of the method according to the present invention, characteristic values of a background color are extracted for blocks of pixels comprising a number of image lines. The representative color distance for a target pixel in an image line is determined with reference to a background color specific to the image line and obtained by interpolation between the characteristic values of background colors extracted for two successive blocks of pixels. This allows the fact that the background areas of the original document vary in color throughout the document to be taken into account.

The present invention also relates to a processing apparatus for converting a digital image obtained by a scanning unit into a converted digital image comprising a statistic module, a selection module, a conversion module and a process unit for applying an algorithm to the digital image, executing the steps of acquiring statistics for at least some pixels of the digital image, extracting characteristic values of a background color using the acquired statistics, operating a selection of pixels in the digital image, each pixel in the digital image being sequentially set as a target pixel, and converting the selected pixels. The selection of the target pixel depends on a representative color distance determined between a number of pixels located in a vicinity of the target pixel and the background color.

The present invention further relates to a computer program product embodied on a computer readable medium comprising instructions for causing at least one process unit to perform the method of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
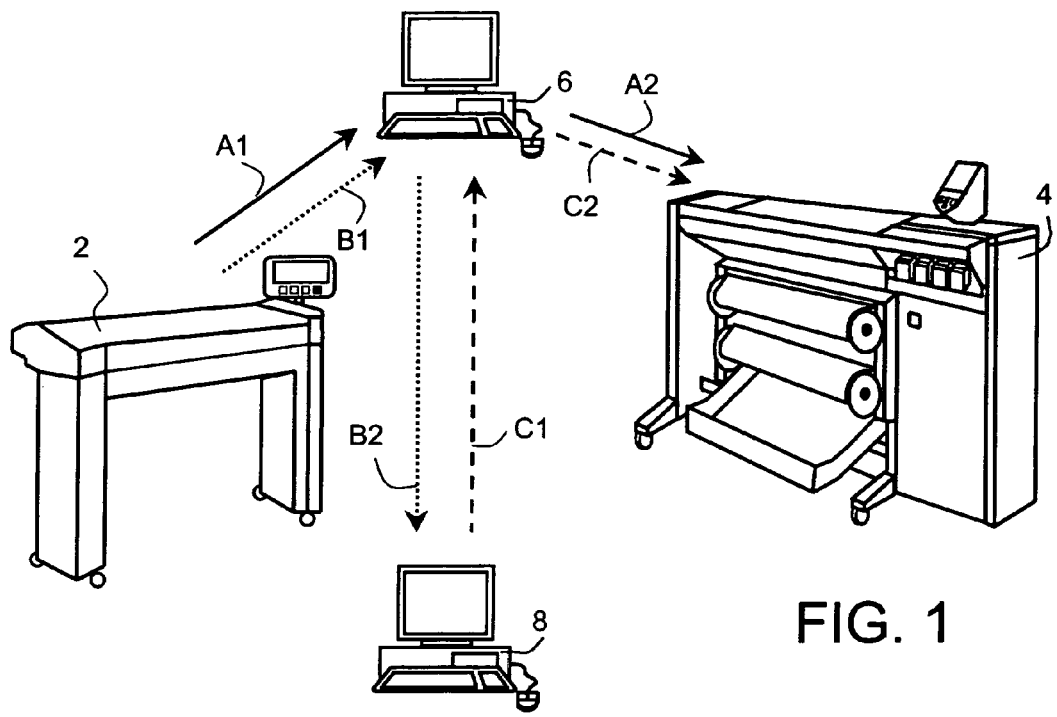
FIG. 1 is a schematic diagram of an environment in which the present invention may be used.

Preferred embodiments of the present invention will now be described with reference to the accompanying drawings, wherein the same or similar elements will be identified with the same reference numerals.

The image conversion method for converting a digital image obtained by a scanning unit into a converted digital image according the present invention may be used in an environment as shown in FIG. 1. A scanning unit 2 is provided for scanning an original color document supported on a support material. The scanning unit 2 is provided with an exposure unit (not shown) for illuminating an original document placed on a glass cover (not shown). A reflecting and guiding unit (not shown) is used for allowing the light which is reflected from the document to be directed towards a CCD type color image sensor (i.e. a photoelectric conversion device) which converts the reflected light into electric signals corresponding to the primary colors red (R), green (G) and blue (B).

A print engine/printing apparatus 4 is provided for printing digital images on image supports. The printing apparatus 4 may use any number of printing techniques. It may be a thermal or piezoelectric inkjet printer, a pen plotter, or a press system based on organic photoconductor technology, for instance. In the example shown in FIG. 1, printing is achieved using a wide format inkjet printer provided with four different basic inks, such as cyan, magenta, yellow and black. The housing contains a printhead that is mounted on a carriage for printing swaths of images. The images are printed on an ink receiving medium such as a sheet of paper supplied by a paper roll. A user interface panel is provided with input means such as buttons for selecting a user, setting queuing parameters, etc.

The scanning unit 2 and the printing apparatus 4 are connected to a printer controller 6 through a network for exchanging data. The printing controller 6 may be a standard computer on which applications are installed for executing various tasks such as receiving input data from the scanning unit 2, handling and scheduling the submitted data files, controlling the scanning unit 2 and the printing apparatus 4, converting image data into printable data, etc.

Moreover, a number of remote client computers may also be connected to the printer controller 6 through a network, such as the client computer 8.

With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color that the pixel should be displayed in. The representation of an image may have each pixel specified by three 8 bit (24 bits total) calorimetric values (ranging from 0-255) defining the amount of R, G, and B respectively in each pixel. In the right proportions, R, G, and B can be combined to form black, white, 254 shades of grey, and a vast array of colors (about 16 million colors). The digital image obtained by the scanning unit 2 may be stored on a memory of the printer controller 6 and may be handled according to a copy path represented by the arrows A1 and A2, wherein the image is printed by the print engine 4. Alternatively, the digital image may be transferred from the printer controller 6 to the client computer 8, as represented in FIG. 1 by the arrows B1 and B2 (scan-to-file path). Later on, a user of the client computer 8 may decide to print the digital image, as represented by the arrows C1 and C2.

Figure 2:
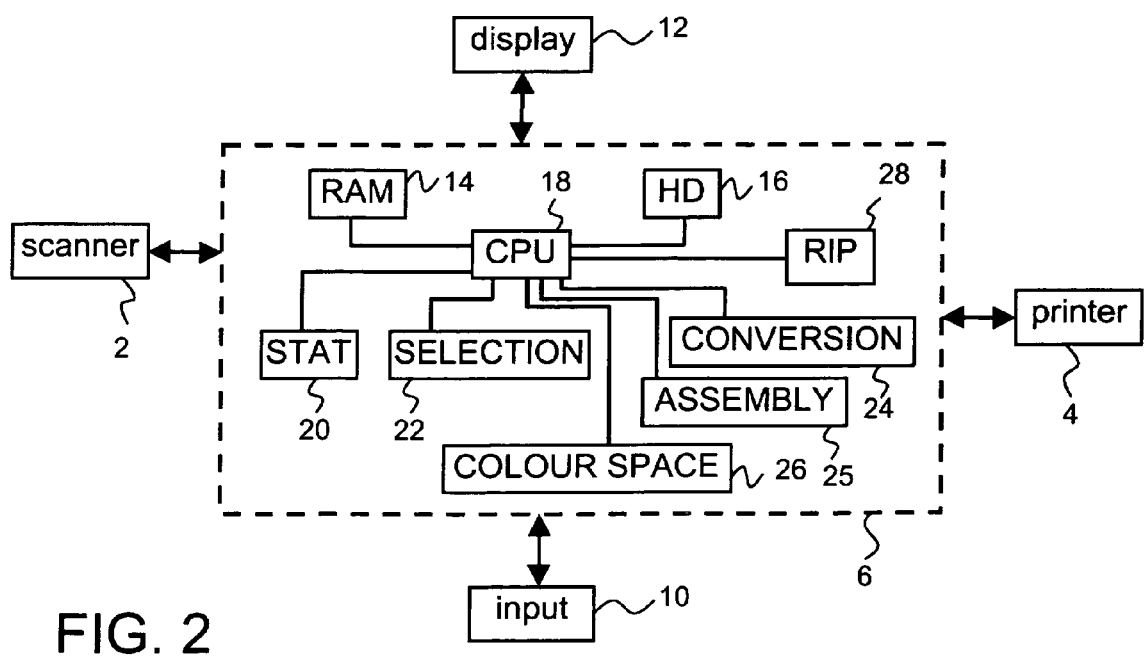
FIG. 2 is a schematic block diagram of the components of a printer controller arranged for carrying out the method of the present invention.

The image conversion method according to the present invention may be implemented in a so-called background correction algorithm comprising a number of steps that are executed by modules running on the printer controller 6, as shown in FIG. 2. The printer controller 6 is provided with a Random Access Memory (RAM) 14, a Hard Disk (HD) 16 and a Central Processing Unit (CPU) 18 for executing stored program instructions which cause the digital image obtained by scanning to be converted. The program instructions correspond to different functions represented in FIG. 2 by modules. A color space module 26 carries out transformations from one system of color coordinates to another, i.e. from a given color space into another color space, when it is required. A statistic module 20 is provided for acquiring statistics for at least some pixels of the digital image and extracting characteristic values of a background color using the acquired statistics. A selection module 22 operates a selection of pixels in the digital image according to the present invention, each pixel in the digital image being sequentially set as a target pixel. A conversion module 24 operates a conversion on the selected pixels in order to convert the colorimetric values of the selected pixels. An assembly module 25 assembles the non-selected pixels (remaining unchanged) and the selected pixels after conversion for forming the converted digital image. The Raster Image Processor (RIP) module 28 produces a bitmap representing a halftoned pattern for printing the converted digital image when the copy path represented by the arrows A1 and A2 is used.

The printer controller 6 may further have an input device 10, such as a keyboard, a mouse or the like, provided to enable a user to enter instructions, and a display 12 such as a monitor.

Figure 3:
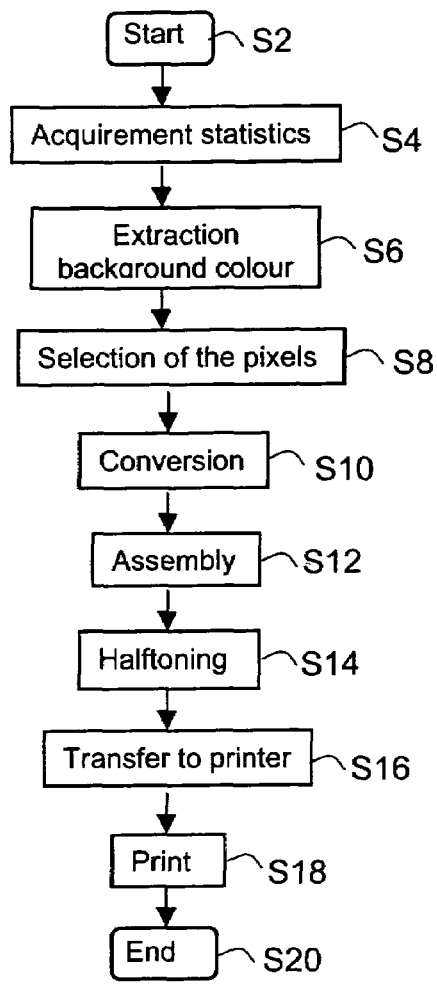
FIG. 3 is a flow diagram of an algorithm according to an embodiment of the present invention.

An embodiment of the present invention will now be explained with reference to FIG. 3, which details the steps of the present invention when a copy path represented by the arrows A1 and A2 has been chosen by a user. It will be clear to one having ordinary skill in the art that the invention may be applied in a similar fashion to a digital image undergoing the scan-to-file path (arrows B1 and B2). It is also possible to apply the invention to a digital image undergoing the print path (arrows C1 and C2), for example, when an image obtained by any scanning unit and not yet converted is stored in the memory of the computer 8 and is to be printed.

Electric signals corresponding to the colors R, G, B are obtained by scanning an original color document on the scanning unit 2. The electric signals are then sequentially sent to the printer controller 6. The printer controller 6 starts to process blocks of raster image data. In step S2 (see FIG. 3), a program executing a background correction algorithm, stored for example on the hard disk 16, is started. The background correction algorithm of the present invention comprises instructions that are executed by the CPU 18 and by the modules 20, 22 and 24.

In step S4, the module 20 acquires statistics for at least some pixels of the digital image. Preferably, the statistics are first acquired by the module 20 for at least a thousand lines of the raster image data. This enables a reliable determination of the background color. A well suited method for extracting a color in images is histogram analysis. A histogram gives the frequency that each color appears in a digital image. The pixels corresponding to each color of a range are counted.

Preferably, pre-quantization is performed in order to speed up the histogram analysis. A 24 bit per pixel (bpp) color raster image, such as may be obtained by a scanner, contains 16 million color values. Computing the frequency of each RGB combination would require a large amount of memory. Therefore, pre-quantization is applied to the digital image in order to reduce the amount of memory needed for the histogram analysis. Preferably, each RGB component is encoded in 5 bits, meaning that the color image reduces to 15 bpp. The 3D range of the histogram becomes 32×32×32 color levels instead of 256×256×256 color levels. As a result, the histogram will give the value of a frequency of a group of adjacent colors corresponding to an 8×8×8 cube in the RGB color space. For each cube, a characteristic color is chosen as the centroid of the cell.

In step S6, the module 20 extracts characteristic values of a background color using the acquired statistics. The characteristic values of the background color may be extracted under the assumption that the background color is the most frequently occurring color. In this case, the extraction of the background color from the histogram corresponds to the absolute maximum value.

Figure 4:
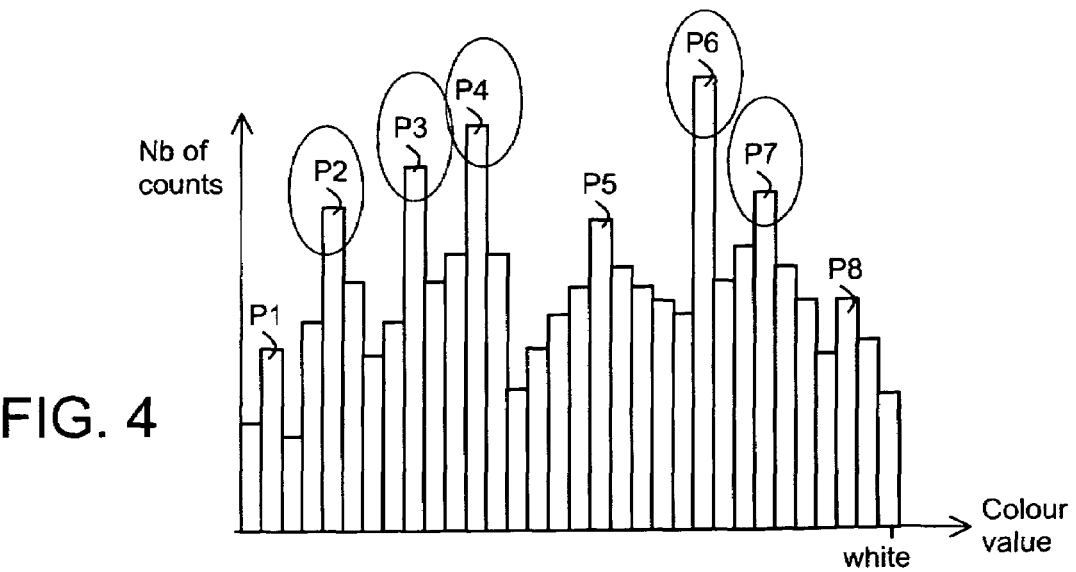
FIG. 4 is a simplified 1D-histogram showing the variation of the frequency occurrence of a color in an image as a function of the color value.

FIG. 4 is a simplified 1D-histogram showing the variation of the frequency occurrence of a color as a function of the color value. In reality, the histogram is three dimensional, each one of the dimensions corresponding to the R, G, or B values. In the example shown in FIG. 4, the peak P6, representing the absolute maximum in frequency occurrence, is selected. The characteristic values of the background color Bg are then simply the RGB values corresponding to the coordinates of the selected peak P6.

Alternately, the determination of the characteristic values of the background color may be based on a different criterion. For example, a number of different peaks in the histogram may be identified and selected if they correspond to a local maximum in frequency occurrence in the histogram. In the example shown in FIG. 4, the curve presents local maximums at the peaks P1, P2, P3, P4, P5, P6, P7 and P8. In order to select the background color among these peaks, which may be in reality numerous, a second selection is done, subsequent to which only a limited number of peaks is kept. With the second selection criterion, only the peaks corresponding to the largest values in frequency occurrence among the found maximums are kept. It may be a fixed number such as keeping five peaks with the five largest values in frequency occurrence. In FIG. 4, only the five peaks P6, P4, P3, P7 and P2 are kept, as is represented by the ovals. It may also be a varying number of peaks, arising from the selection of a fixed percentage (for example 10%) of the peaks among the peaks corresponding to local maximum in frequency occurrence. Finally, to decide which of the selected peaks corresponds to the background color, it is assumed that the background color corresponds to the peak which is the nearest to an expected predefined color value for the background color, for example white. In the example of FIG. 4, the peak P7 is selected, since it is, among the five selected peaks, the closest to the white color. With this alternative way of determining the background color, the characteristic values of the background color Bg are then simply the RGB values corresponding to the position of the selected peak P7. Another predefined expected color value for the background color may be chosen, based on the knowledge of the approximate background color of the original document, for example a yellow or blue color.

In step S8, the selection module 22 operates a selection of the pixels to be converted. Each pixel in the digital image is sequentially set as a target pixel. The selection of the target pixel depends on a representative color distance determined between a number of pixels located in the digital image in a vicinity of the target pixel and the background color.

Preferably, the representative color distance is the averaged squared distance between a number of pixels located in the vicinity of the target pixel and the background color. The target pixel is selected if the representative color distance is less than a predefined threshold value as explained in the following example.

In an embodiment of the method of the present invention, the selection module 22 firstly computes, in a color space, the squared distance $\Delta_{i,j}^2$ of each pixel (i,j) in the digital image to the determined background color Bg. Preferably, the color distance computations between each pixel (i,j) of the raster image and the background color Bg are performed in a perceptual color space such as the L*a*b* color space.

A perceptual color space such as the L*a*b* color space is particularly well suited for comparing colors with each other. Within such a color space, the distance between two colors, computed as the Euclidean distance, is similar to the distance perceived by the human eye. The transforms from the RGB color space to the L*a*b* color space are performed by the color space module 26 according to well-known formulae.

In the L*a*b* color space, the calorimetric coordinates of the background color Bg are noted ($L_{Bg}$, $a_{Bg}$, $B_{Bg}$) while the coordinates of a pixel (ij) in the processed raster image are noted ($L_i$, $a_i$, $b_i$). The squared color distance $\Delta_{i,j}^2$ is given by:

$$\Delta_{i,j}^2 = (L_i - L_{Bg})^2 + (a_i - a_{Bg})^2 + (b_i - b_{Bg})^2 \qquad (1)$$

Figure 5:
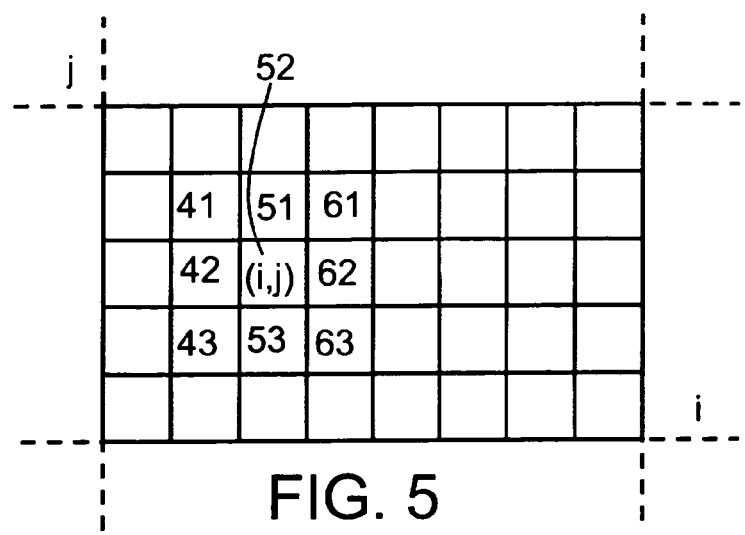
FIG. 5 is a schematic diagram of a portion of a raster image being processed, according to an embodiment of the present invention.

Then, for each pixel (i,j), the averaged squared distance between a number of pixels located in the digital image in a vicinity of the target pixel and the background color is computed. The averaged squared distance $\Delta_{AV(i,j)}^2$ is given by:

$$\Delta_{AV(i,j)}^2 = \sum_{\substack{k=i-(N-1)/2 \\ l=j-(N-1)/2}}^{\substack{k=i+(N-1)/2 \\ l=j+(N-1)/2}} \Delta_{k,l}^2 / N^2, \qquad (2)$$

wherein N is an odd integer. A portion of the raster image is shown in FIG. 5, with the target pixel (i,j) being identified by the reference sign 52. In order to compute the value of the averaged squared distance $\Delta_{AV(i,j)}^2$ for the pixel 52, a number of pixels located in a vicinity of the target pixel 52 are taken into account for the determination of the averaged squared distance. With N=3, the pixels taken into account are located within a square having as a center the target pixel 52 and having a side equal to 3 pixels. The pixels taken into account in this example are the pixels 41, 51, 61, 42, 52, 62, 43, 53 and 63. It is noted, in formula (2), that the target pixel 52 itself enters in the calculation. However, alternately, the target pixel could be left out from the determination of the representative color distance $\Delta_{AV(i,j)}^2$. Another well suited value for N is 5. When the target pixel is located in the raster image at a border of the image, virtual pixels are added to perform the calculation of $\Delta_{AV(i,j)}^2$, for example by mirroring a reduced number of existing pixels, according to well-known techniques.

Figure 6:
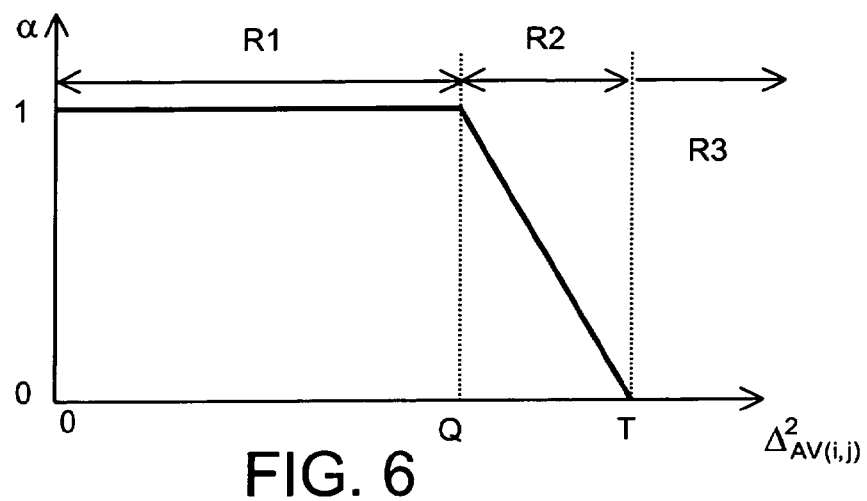
FIG. 6 represents the variation of the correction factor α as a function of the representative color distance of a target pixel selected for conversion.

According to an embodiment of the present invention, if the representative color distance $\Delta_{AV(i,j)}^2$ is less than a predefined threshold value T, the pixel (i,j) is selected for conversion. As illustrated in FIG. 6, the pixels having an averaged squared value $\Delta_{AV(i,j)}^2$ in the zone R3 are not selected. On the other hand, the pixels having an averaged squared value $\Delta_{AV(i,j)}^2$ in the portion R2 or R1 are selected, since their $\Delta_{AV(i,j)}^2$ is less than the predefined threshold value T. As indicated above, preferably, the selection of said pixels is done according to the values of color distances expressed in a perceptual color space. The threshold value T may be determined empirically and is also dependent of the color space chosen for carrying out the selection. It may also be parameterized depending on the characteristics of the digital image.

In step S10, the conversion module performs a conversion of the selected pixels. An example of a conversion function is now explained. A selected pixel is converted to pure white if the averaged squared value $\Delta_{AV(i,j)}^2$ is less than a predefined threshold value Q, whereby Q is smaller than T (this corresponds to the zone R1 in FIG. 6). A selected pixel is converted in a linear fashion if the averaged squared value $\Delta_{AV(i,j)}^2$ is comprised between Q and T (this corresponds to the zone R2 in FIG. 6). Preferably, the conversion calculations are performed in the RGB color space, which is beneficial for the simplicity of the calculations. The conversion function may expressed by the following formula:

$$\begin{bmatrix} R' \\ G' \\ B' \end{bmatrix} = \alpha \begin{bmatrix} 255 \\ 255 \\ 255 \end{bmatrix} + (1 - \alpha) \begin{bmatrix} R \\ G \\ B \end{bmatrix} \qquad (3)$$

wherein (R', G', B') are the converted (R, G, B) values of the pixel (i,j) and α is a correction coefficient being a function of $\Delta_{AV(i,j)}^2$ as shown in FIG. 6. For the selected pixels having the averaged squared value $\Delta_{AV(i,j)}^2$ in the zone R1, α is one, and the RGB values of the pixels are converted to (255,255,255), i.e. to white pixels (absence of a printable pixel). For the selected pixels having the averaged squared value $\Delta_{AV(i,j)}^2$ in the zone R2, α varies linearly between one and zero, which represents a gradual transition from a full conversion (white pixel) to a non-conversion (pixel left unchanged).

In step S12, the assembly module 25 assembles the non-selected pixels (remaining unchanged) and the converted pixels thus forming the converted digital image.

In step S14, the converted digital image is halftoned by the RIP module 28. The converted digital image is transformed by the RIP module 28 into an array of dots to be rendered by the print engine 4.

In step S16, the halftoned image is transferred to the printing apparatus 4 for printing.

In step S18, the halftoned image is printed by the printing apparatus 4.

This is the end (S20) of a so-called copy path represented by the arrows A1 and A2.

Figure 7:
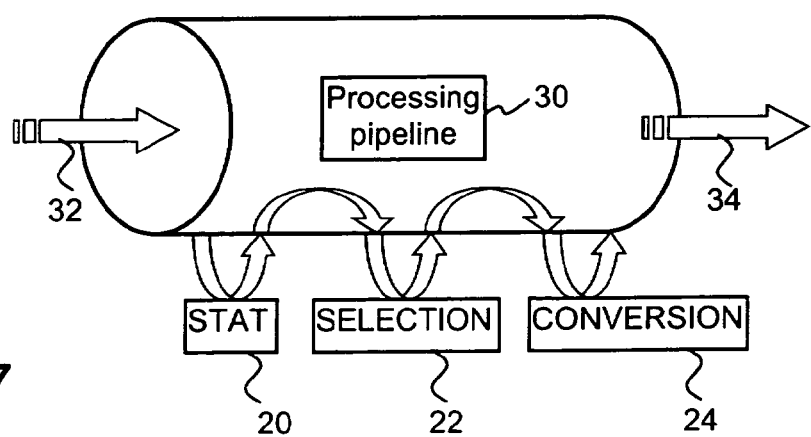
FIG. 7 is a schematic block diagram of a processing pipeline's portion.

Preferably, the method according to the present invention is implemented in an algorithm managed by a processing pipeline of which a portion 30 is shown in FIG. 7. The processing is divided into a number of processing functions that are packaged in the form of software modules (20, 22, 24). A block of input data 32 is fed in the pipeline portion and is processed by the different modules. The output data 34 may then be processed by other modules. A block of data may be a band of the raster image data comprising a number of image lines.

One block of data is available at one time in the memory 14. Once processed, the block of data is released from the memory 14 and may be printed or saved on the hard disk 16 or the like. Though the block of data is released from the memory 14, statistical information on the block data may be kept in the memory 14.

The background color may vary within the original color document being scanned, due to imperfections of the paper or to the effects of ageing or the like. Therefore, it is useful to consider that the background color value is a variable for operating the selection and conversion of the pixels. When the first data block is processed, first characteristic values of a background color are extracted according to the histogram. For each next data block, new characteristic values of a background color may be extracted, according to the histogram of each data block. Visible artifacts could appear in the converted image if the pixels in each data block were converted according to the block's own characteristic values of the background color. Preferably, the characteristic values of the background color progress during the processing of the raster image in such way that the transition from a block to another block is smooth. According to this purpose, the characteristic values of the background color progress and are determined according to the following steps.

A first estimation of the background color is made by acquiring statistics of a predefined number of lines of image data, for example the first thousand lines. The pixels of the corresponding data block are processed according to this first determined background color, converted according to the algorithm detailed above, and released from the RAM 14. Statistical information about said data block is kept.

Thereafter, the next data block is stored in the RAM 14 until another predefined number of raster image lines is reached. A new histogram analysis is carried out for this data block, and a background color is extracted for this block. The characteristic values of the background color are then evaluated on a line-per-line basis. For the first line of a data block, the previous background color is used. For the next lines, the background color values are linearly interpolated from the previous block value to the current block value. This allows a smooth transition of the background color value from an image line to another. The pixels of each line of the data block are selected and converted according to the algorithm detailed above, taking into account the background color value determined for said line.

For the next data block to be converted, the same procedure is used, until the end of the image is reached.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image conversion method for converting a digital image obtained by a scanning unit into a converted digital image, comprising the steps of:
    acquiring statistics for at least some pixels of the digital image;
    extracting characteristic values of a background color using the acquired statistics;
    selecting pixels in the digital image; and
    converting the selected pixels,
    wherein each pixel in the digital image is sequentially set as a target pixel, and the selection of a target pixel depends on a representative color distance determined between a number of pixels located in a vicinity of the target pixel and the background color.

2. The image conversion method for converting a digital image according to claim 1, wherein the representative color distance is the averaged squared distance between a number of pixels located in the vicinity of the target pixel and the background color.

3. The image conversion method for converting a digital image according to claim 2, wherein the representative color distance is determined in a perceptual color space.

4. The image conversion method for converting a digital image according to claim 2, wherein the target pixel is selected if the representative color distance is less than a predefined threshold value.

5. The image conversion method for converting a digital image according to claim 2, wherein said steps of acquiring statistics, extracting characteristic values of a background color, selecting pixels in the digital image, and converting the selected pixels are successively applied to blocks of pixels in the digital image.

6. The image conversion method for converting a digital image according to claim 5, wherein characteristic values of a background color are extracted for each block of pixels.

7. The image conversion method for converting a digital image according to claim 6, wherein the blocks of pixels comprise a number of image lines, the representative color distance for a target pixel in an image line is determined with reference to a background color specific to the image line and obtained by interpolation between the characteristic values of background colors extracted for two successive blocks of pixels.

8. The image conversion method for converting a digital image according to claim 1, wherein the representative color distance is determined in a perceptual color space.

9. The image conversion method for converting a digital image according to claim 1, wherein the target pixel is selected if the representative color distance is less than a predefined threshold value.

10. The image conversion method for converting a digital image according to claim 1, wherein said steps of acquiring statistics, extracting characteristic values of a background color, selecting pixels in the digital image, and converting the selected pixels are successively applied to blocks of pixels in the digital image.

11. The image conversion method for converting a digital image according to claim 10, wherein characteristic values of a background color are extracted for each block of pixels.

12. The image conversion method for converting a digital image according to claim 11, wherein the blocks of pixels comprise a number of image lines, the representative color distance for a target pixel in an image line is determined with reference to a background color specific to the image line and obtained by interpolation between the characteristic values of background colors extracted for two successive blocks of pixels.

13. An apparatus for converting a digital image obtained by a scanning unit into a converted digital image comprising:
    a statistic module;
    a selection module;
    a conversion module; and
    a process unit, said process unit applying an algorithm to the digital image, acquiring statistics for at least some pixels of the digital image, extracting characteristic values of a background color using the acquired statistics, selecting pixels in the digital image, and converting the selected pixels,
    wherein each pixel in the digital image is sequentially set as a target pixel, and the selection of a target pixel depends on a representative color distance determined between a number of pixels located in a vicinity of the target pixel and the background color.

14. The apparatus according to claim 13, wherein the representative color distance is the averaged squared distance between a number of pixels located in the vicinity of the target pixel and the background color.

15. The apparatus according to claim 14, further comprising a scanning unit for acquiring digital images.

16. The apparatus according to claim 15, further comprising a print engine for printing image data.

17. The apparatus according to claim 13, further comprising a scanning unit for acquiring digital images.

18. The apparatus according to claim 17, further comprising a print engine for printing image data.

19. A computer program product embodied on a computer readable medium for converting a digital image obtained by a scanning unit into a converted digital image, said computer program product comprising instructions for causing at least one process unit to perform the steps of:
    acquiring statistics for at least some pixels of the digital image;
    extracting characteristic values of a background color using the acquired statistics;
    selecting pixels in the digital image; and
    converting the selected pixels,
    wherein each pixel in the digital image is sequentially set as a target pixel, and the selection of a target pixel depends on a representative color distance determined between a number of pixels located in a vicinity of the target pixel and the background color.

20. The computer program product for converting a digital image according to claim 19, wherein the representative color distance is the averaged squared distance between a number of pixels located in the vicinity of the target pixel and the background color.

* * * * *